(12) United States Patent
Joyce et al.

(10) Patent No.: US 12,244,473 B2
(45) Date of Patent: Mar. 4, 2025

(54) PREDICTIVE SYSTEM FOR OPTIMIZING API BEHAVIORS

(71) Applicant: Cisco Technology, Inc., San Jose, CA (US)

(72) Inventors: John A Joyce, Nashua, NH (US); Nathan J. Sowatskey, Madrid (ES); Shridhar Saurin Shah, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

(21) Appl. No.: 18/353,247

(22) Filed: Jul. 17, 2023

(65) Prior Publication Data
US 2025/0030616 A1    Jan. 23, 2025

(51) Int. Cl.
*H04L 41/16* (2022.01)
*H04L 41/0816* (2022.01)
*H04L 41/5009* (2022.01)
*H04L 43/08* (2022.01)

(52) U.S. Cl.
CPC ...... *H04L 41/5009* (2013.01); *H04L 41/0816* (2013.01); *H04L 41/16* (2013.01); *H04L 43/08* (2013.01)

(58) Field of Classification Search
CPC ............................ H04L 41/5009; H04L 41/16
See application file for complete search history.

(56) References Cited

U.S. PATENT DOCUMENTS

| | | |
|---|---|---|
| 2011/0145842 A1* | 6/2011 | Tofighbakhsh ....... H04L 45/306 719/328 |
| 2013/0304869 A1 | 11/2013 | Gupta et al. |
| 2014/0359091 A1* | 12/2014 | Senniappan .......... H04L 41/122 709/221 |
| 2017/0372232 A1 | 12/2017 | Maughan et al. |
| 2019/0230025 A1* | 7/2019 | Kommula ........... H04L 41/0895 |
| 2019/0392354 A1* | 12/2019 | Yang ........................ G06N 5/04 |
| 2020/0021620 A1 | 1/2020 | Purathepparambil et al. |
| 2020/0099709 A1 | 3/2020 | Vasseur et al. |
| 2020/0366530 A1* | 11/2020 | Mukundan .............. H04L 12/66 |
| 2021/0136095 A1* | 5/2021 | Dinh ........................ G06N 5/01 |
| 2022/0060393 A1* | 2/2022 | Vasseur ............... H04L 41/5025 |
| 2022/0086085 A1* | 3/2022 | Wood ...................... H04L 45/08 |
| 2022/0231950 A1* | 7/2022 | Ramaswamy ........ H04L 45/123 |
| 2022/0321443 A1* | 10/2022 | Bajaj ........................ H04L 1/08 |
| 2022/0368646 A1* | 11/2022 | Vedam .................. H04L 47/781 |

* cited by examiner

*Primary Examiner* — Lesa M Kennedy
(74) *Attorney, Agent, or Firm* — Baker Botts L.L.P.

(57) ABSTRACT

The disclosure relates to a system and method of optimizing one or more paths between an Application Programing Interface (API) gateway and one or more endpoints. Properties associated with each of a plurality of paths between at least one device and an API gateway are collected, and the properties associated with each of the plurality of paths are monitored to determine a current level of performance for each of the paths. Using gathered data, the API gateway can then analyze, using machine learning, the current level of performance for each of the paths and the current load of the at least one device to determine if a corrective action is needed to maintain an optimal performance of the API gateway, the plurality of paths, and the at least one device.

20 Claims, 6 Drawing Sheets

PREDICTIVE SYSTEM FOR OPTIMIZING API BEHAVIORS

TECHNICAL FIELD

The present disclosure relates generally to techniques for load balancing and workload optimization in a network. More specifically, it is directed to mechanisms and techniques to consider path properties and system telemetry for load balancing using machine learning (ML) in an Application Programing Interface (API) gateway.

BACKGROUND

In a cloud computing system, front-end clients (mobile, web, and desktop applications) require a communication channel to interact with back-end microservices. In one simple implementation, the front-end client may directly communicate to the back-end microservices. Alternatively, a widely accepted design is to implement an Application Programing Interface (API) gateway between the front-end application and back-end microservices. The API gateway service abstracts the back-end core microservices. Implemented as a web API, it acts as a reverse proxy by routing incoming traffic to the internal microservices. Additionally, the gateway insulates the client from internal service partitioning and refactoring. If a change is made to a back-end service, it may be accommodated in the gateway without breaking a client device. Further, an API gateway is the first line of defense for cross-cutting concerns, such as identity, caching, resiliency, metering, and throttling. Many of these cross-cutting concerns may be off-loaded from the back-end core services to the API gateway, simplifying the back-end microservices. Even with the use of an API gateway, due to the complexity and increased reliance on networks such as the Internet, various challenges still arise.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
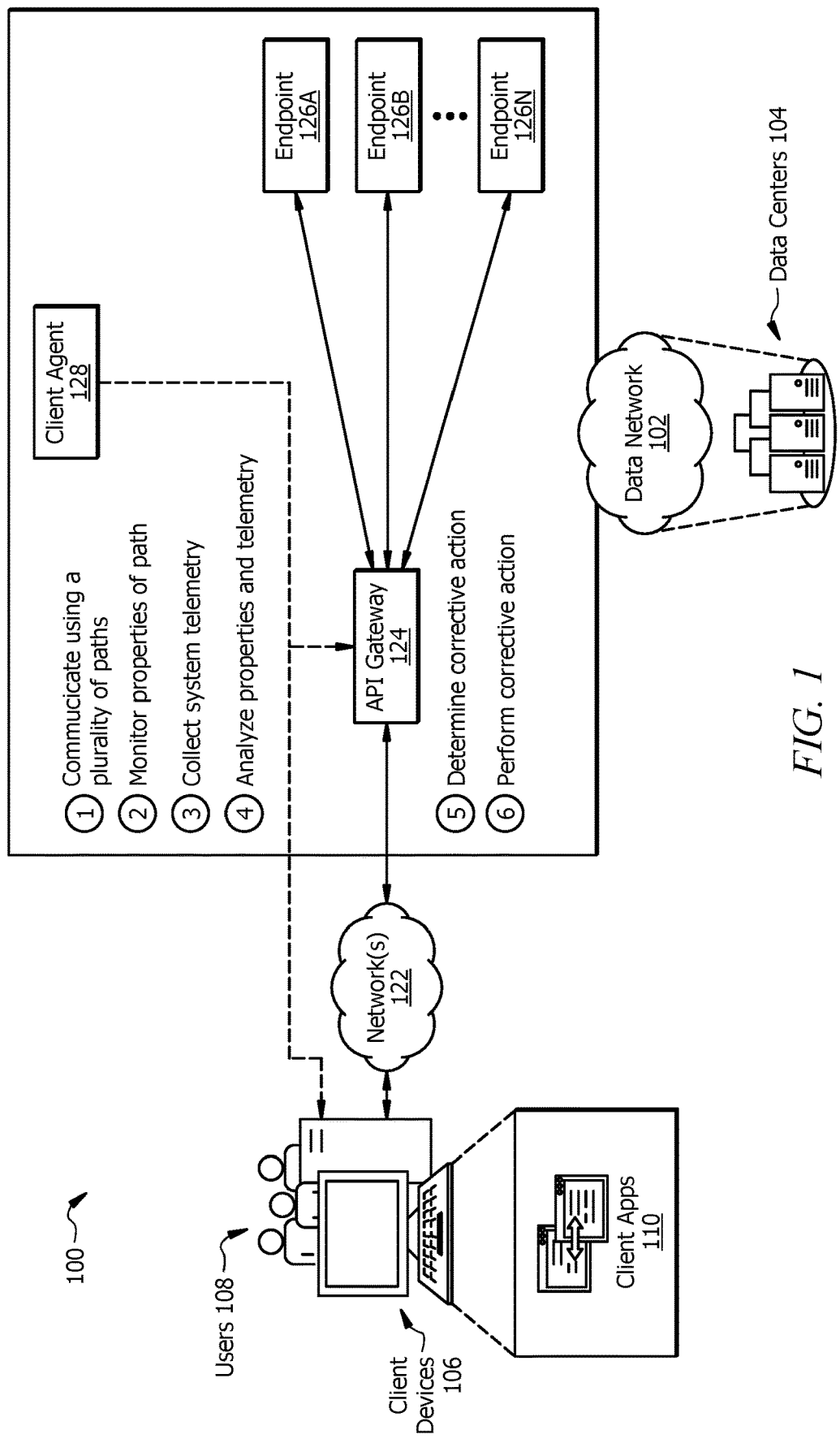
FIG. 1 illustrates a system diagram of network architecture for performing workload optimization for an API gateway in accordance with at least one embodiment.

This disclosure further describes a method for collecting properties associated with each of the plurality of paths between a device and an API gateway. The properties associated with each of the plurality of paths are monitored to determine a current level of performance for each of the paths. Additionally, the current load of the at least one device is monitored. Once the current load of the at least one device and current performance level of each of the paths is determined, they are analyzed using machine learning (ML) to determine if a corrective action is needed to maintain an optimal performance of the API gateway, the plurality of paths, and the at least one device. If corrective actions are determined to be needed, then they are performed.

This disclosure additionally describes a computer system that comprises an API gateway. The API gateway includes one or more processors, and one or more computer-readable non-transitory storage media coupled to the one or more processors. The non-transitory storage media includes instructions operable when executed by the one or more of the processors to cause the system to perform a method. The method collects properties associated with each of the plurality of paths between a device and an API gateway, and the at least one device is an endpoint device. The properties associated with each of the plurality of paths are monitored to determine a current level of performance for each of the paths. Additionally, the current load of the at least one device is monitored. Once the current load of the at least one device and current performance level of each of the paths is determined, they are analyzed using machine learning (ML) to determine if a corrective action is needed to maintain an optimal performance of the API gateway, the plurality of paths, and the at least one device. If corrective actions are determined to be needed, then they are performed.

This disclosure also describes at least one non-transitory computer-readable storage medium having stored instructions. When the instructions are executed by one or more processors, the instructions cause the processors to collect properties associated with each of the plurality of paths between a device and an API gateway, and the at least one device is an endpoint device. The properties associated with each of the plurality of paths are monitored to determine a current level of performance for each of the paths. Additionally, the current load of the at least one device is monitored. Once the current load of the at least one device and current performance level of each of the paths is determined, they are analyzed using machine learning (ML) to determine if a corrective action is needed to maintain an optimal performance of the API gateway, the plurality of paths, and the at least one device. If corrective actions are determined to be needed, then they are performed.

Certain systems and methods described herein may allow for load balancing to be performed in a system utilizing an API gateway in an efficient manner. The systems and methods provide for using machine learning (ML) to predict when load balancing or other changes are needed in a system, prior to significant network or system degradation. This reduces or eliminates noticeable network deficiencies, improving the experience of end users.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes techniques to improve API gateway efficiency in a data network. Specifically, the techniques and mechanisms described herein enable the API gateway to use path properties and system telemetry to optimize and balance its requests and workload. For instance, modem high traffic websites serve hundreds of thousands, if not millions, of concurrent requests from users or clients and return the correct text, image, video, or application data, all in a fast and reliable manner. To cost effectively scale to meet these high volumes, modem computing best practice generally requires adding more servers. The API gateway load balancer acts as the "traffic cop" sitting in front of servers and routing client requests across the servers capable of fulfilling those requests in a manner that maximizes speed and capacity utilization and ensures that no one server is overworked, which could degrade performance. If a single server goes down, the load balancer redirects traffic to the remaining online servers. When a new server is added to the server group, the API gateway load balancer automatically starts to send requests to it.

In some instances, an API gateway sits between two endpoints such as a client device and one or more other endpoints, which could be physical devices and/or logical processes. The API gateway may act as a reverse proxy to accept the API calls, aggregate the various services required to fulfill them, and return the appropriate result. The endpoints are examples of processes, which are subject to variances in load, cost, geographical location, regulatory compliance, and similar properties. Further, the endpoints may be reached over paths that have similar properties (e.g., latency, regulator, encryption, and similar attributes). Finally, the endpoints may be moved to balance the workload at the API gateway, or to place or instantiate workloads in run time environments that satisfy specific regulatory constraints, for example geographical location. Similarly, the API gateway may perform a path optimization, and change the path from the API client device to API gateway to balance its load, or the properties of the path to address regulatory or compliance constraints such an encryption, or so that the path is within specific geographical constraints.

In some instances, the techniques may be utilized in a Software Defined-Wide Area Network (SD-WAN). A SD-WAN (or SDN) allows dynamic configuration of the network by taking a new approach to the network architecture. SD-WAN is a fully software driven network technology which allows for decoupling networking hardware from its control mechanism.

In some examples, the techniques and mechanisms provided herein include mechanisms for load balancing in an API gateway. In some variants, the load balancing gateway may be integrated with mechanisms that could provide data about the status of endpoints, workloads, the path to those workloads, and the workload management and optimization mechanisms. As a result, these techniques enable the API gateway to make better informed decisions, adding value and optimizing by determining which endpoints the API gateway will dispatch to when receiving requests from endpoints with specific properties, or for APIs with specific properties, or for API requests with specific properties, or given specific path properties, and combinations thereof. In some examples, the API gateway may be able to detect increased load for the API, in a variety of circumstances. In this regard, the API gateway may signal workload optimization systems to move endpoints (or "endpoint processes" or simply "processes"), auto-scale network links (e.g., SD-WAN, LAN, etc.), and similar actions in response to the API gateway awareness of API request loads, and other properties associated with API request structure and path from source. As described herein, an "endpoint" (or "endpoint process") may be a physical device such as a client computational device, a cloud environment, or other physical computational devices, or the endpoint may be a virtual resource such as a virtual machine, a container, a serverless function, a process, and/or any type of function. Traditionally, the API gateway system may not be integrated with load balancing mechanisms, or composed of multiple, distributed, federated, coordinated gateways, and it may not form an awareness of the entirety of the multi-cloud runtime of distributed services, and thus will be unable to use awareness for optimization.

In some examples, the API gateway may detect abnormalities in the API requests or responses for the given APIs, in a variety of circumstances. In response to detecting abnormalities, the API gateway may imitate workload optimization actions. The abnormalities may include increased load request volumes, increased response latency from the API endpoint and/or in requests from the endpoints and/or in responses to an endpoint, business transaction failures, a higher rate of failures such as transport timeouts, and so on. In some examples, when the API gateway detects abnormalities, the API gateway may perform several actions including: (i) spawning more endpoints (ii) moving endpoints or API gateway processes (iii) adjusting path capacity from the client endpoint to API gateway and/or the API gateway to the API endpoint (iv) changing the SD-WAN topology to use different paths and/or (v) applying encryption, QoS headers, or other packet level changes to the traffic between the client/endpoint, API gateway, and/or API endpoint.

In some examples, the techniques described herein allow the components to co-locate in a single environment or be distributed in multiple environments. For example, multiple gateways may be federated to distribute and balance loads across endpoints wherever they may reside. Further, the agents that are interacting with the gateway to supply status or perform action may likewise be distributed and/or federated to enable consistent behavior across geographical, implementation runtime, or administrative boundaries.

Additionally, the techniques described herein may increase the breadth of components that an API gateway interacts with. As a result, this may enable the API gateway to obtain a more complete view of API requests as well as the current status of the requests processing.

However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example system for performing workload optimization in an API (Application Programing Interface) according to some aspects of the current disclosure. FIG. 1 further illustrates a network API gateway and its serving endpoint for processing a packet between or across networks. The system 100 may include a network 102 that may include one or more data centers 104. FIG. 1 further illustrates API gateway 124 and endpoints devices 126A-N connected to the network 102 provide an interface for connecting the client devices 106 to network 102 via the networks(s) 122. FIG. 1 further includes a client agent 128 for interacting and/or providing telemetry to the API gateway 124. Also, FIG. 1 includes an additional endpoint in the form of a client device 106 that hosts client applications 110, which may interact with the API gateway via the client devices 106 and networks 122.

In some examples, the network 102 may include devices housed or located in one or more data centers 104. The network 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers. The network 102 may include various hardware devices, such as routers, switches, gateways, smart NICs, NICs, ASICs, FPGAs, servers, and/or any other type of devices. Further, the network 102 may include virtual resources, such as VMs, containers, and/or other virtual resources. Additionally, or alternately, the techniques described herein are applicable to container technologies, such as Docker®, Kubernetes®, and so forth.

The one or more data centers 104 may be physical facilities or buildings located across geographic areas that are designated to store networked services that are part of the network 102. The data centers 104 may include various networking devices, as well as redundant or backup components and infrastructure for power supply, data communications connections, environmental controls, and various security devices. In some examples, the data centers 104 may include one or more virtual data centers that are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be in explicitly defined data centers 104 but may be located in other locations or buildings.

The client devices 106 may identify communication connections over one or more networks 122 to communicate with devices in the network 102, such as API gateway 124, and endpoint devices 126. The network(s) 122 may include any viable communication technology, such as wired and/or wireless modalities and/or technologies. Networks 122 may include any combination of Personal Area Networks (PANs), Local Area Networks (LANs), Campus Area Networks (CANs), Metropolitan Area Networks (MANs), extranets, intranets, the Internet, short-range wireless communications network (e.g., ZigBee, Bluetooth, etc.), Wide Area Networks (WANs)—both centralized and/or distributed—and/or any combination permutation, and/or aggregation thereof. Users 108 may communicate using any type of protocol over the network 122, such as the transmission control protocol/Internet protocol (TCP/IP) that is used to govern connections with the Internet.

The endpoint device 126 may include a plurality of devices 126A-126N and may include any network capable hardware/software devices that can connect to the data network 102 using any type of communication protocol. For instance, the endpoint devices 126 may refer to desktop computers, laptops, smartphones, tablets, printers, or any other specialized hardware such as sensors, actuators, smart meters, etc. The client devices 106 may also serve as endpoint devices and may include network interfaces to connect to the network 122 and/or data network 102.

The endpoint devices 126 may be separate devices such as the client devices 106 or may be endpoints devices hosted on one or more data centers 104. Each endpoint device 126A may be geographically located with another endpoint device 126N or may be geographically dispersed. For example, a first endpoint device may be a client device 106 that is connected through network 122 to API gateway 124. The API gateway 124 is then connected to a first endpoint device 126A located at a local data center while the gateway is also connected to a second endpoint located in an external cloud environment.

The API gateway 124 connects the network nodes such as endpoint devices 126 to the network 122. Also, the gateway 124 may act as a proxy to accept all API requests, perform various services required to fulfill them, and return the appropriate result. In some examples, the API gateway 124 may include a workload optimizer that may move workloads between runtime environments to achieve optimal conditions. In some variants, the API gateway 124 may detect a degradation in the path to an endpoint device 126 and determines whether the endpoint devices need to be moved to a new location.

The API gateway 124 may be on the edge of networks 102 and 122 and provide connectivity of the nodes of network 102 such as endpoint devices 126A-N to the nodes of the network 122 such as client devices 106. The API gateway 124 manages the workloads of the endpoint devices 126A-N. In some examples, the endpoint devices 126A-N may be subject to variances in load, trustworthiness, cost, geographical location, regulatory compliance, and similar properties. In some examples, the endpoint devices 126A-N may be reachable from the API gateway 124 over routes or links that also have similar properties, as well as latency, routing, encryption, and other attributes.

In some examples, the API gateway 124 may include mechanisms that may provide status of endpoint workloads, the path to those workloads, and how the workloads may be managed and optimized. The API gateway 124 may initiate a workload optimization action to manage abnormalities in API requests such as increased request loads, increased response latency, business transactions failures, a higher rate of connection failures, and similar. As a result, the API gateway 124 may move the endpoints, perform auto-scaling, increase the number of endpoints, etc.

The API gateway 124 may comprise a single device or a plurality of devices and may be separate or a part of any of the other components shown in FIG. 1. The API gateway 124 may also be virtual and hosted on any number of gateways, routers, and/or other computational devices.

At "1", endpoints, (such as the client device and/or device it is communicating with), communicate with each other using a plurality of paths. The communication may include API requests using a first path that is established between the client devices 106 and the API gateway 124. The client devices 106 may include client applications 110 triggered by the user (e.g., mobile, web, etc.) to perform specific tasks on the server. The paths carry user requests from the client applications 110 to run services to the gateway, as well as data between the endpoints and the client applications 110. It may also carry other crosscutting signaling such as authentication, encrypted or decryption signaling data. As described herein, a client agent 128 may provide a means to communicate information about the information about the client devices 106 and the path to the client devices 106.

At "2", the API gateway 124 monitors the properties of the various paths. API gateway 124 monitors path properties to see if it detects any abnormalities in the traffic for API requests or responses for a given APIs, in a variety of circumstances. The abnormalities may include increased request load, increased response latency, business transaction failures, a higher rate of connection failures, etc. In some examples, the API gateway 124 detects abnormalities from the path properties reported by the path property component (agent).

At "3", the API gateway 124 collects system telemetry. The telemetry may be obtained from the endpoint devices 126, client devices 106 through the client agent 128, and from other sources. The telemetry may include such things as historical requests and needs, runtime data, social, economic trends, calendar data, and other pertinent data. The telemetry is collected and monitored along with data previously collected, allowing a larger data set for step "4" as well as the ability to make more accurate models.

At "4", the API gateway 124 analyzes the properties of the plurality of paths and along with both real-time and historical telemetry and makes models of current and predicted future operating capabilities and needs. As will be described in more detail later, these models may be made utilizing machine learning (ML) or other forms of AI. By utilizing the models, changes in the telemetry and/or path may be detected, and corrective action may be performed prior to noticeable degradation or other deleterious effects occurring.

At "5", the API gateway 124 determines a corrective action or other remedial action to overcome any current or predicted future abnormalities. For example, the remedies may include spawning more endpoints, moving endpoints or API gateway 124 processes, auto-scaling, or changing SD-WAN paths, applying encryption, etc. These remedies may be possible due to the API gateway 124's awareness of various properties, including, but not limited to, API request load, properties associated with a specific API request, properties associated with the API request source client, path from client devices 106 to API gateway 124, path from API gateway 124 to API endpoint devices 126A-126N, and awareness of the other API gateways 124. In some examples, the remedial action may include several mechanisms that may distribute a load across a set of workloads that can handle a request while spanning over multiple cluster boundaries. The remedial action may additionally, or alternatively, remedy degradation in the path properties by selecting or spawning endpoints based on the path properties.

At "6", the API gateway 124 performs the corrective or remedial actions determined in step "5" as described above, and initiates, for example, a workload optimization, path optimization, etc. In some examples, the API gateway 124 may move workloads between runtime environments to achieve optimal conditions as a consequence of actions based on its awareness of system state, and/or as consequences of signals about state from other system components.

It is worth mentioning that the techniques described in the steps 1-6 describe an integrated API gateway 124 that includes mechanisms for coordinating API client/endpoint device requests and workload and path optimizations. The integrated gateway, as described above, may provide better-informed decisions than a gateway that is not able to take into account the range of properties that are described above, and may play an integrated role with the other system components. Further integrated and coordinating API gateway systems may include multiple distributed coordinating gateways and may perform an awareness of the entirety of the multi-cloud runtime for distributed services. Accordingly, it may use the awareness to optimize workloads or paths in a way that no single component in the environment may be able to perform.

Figure 2A:
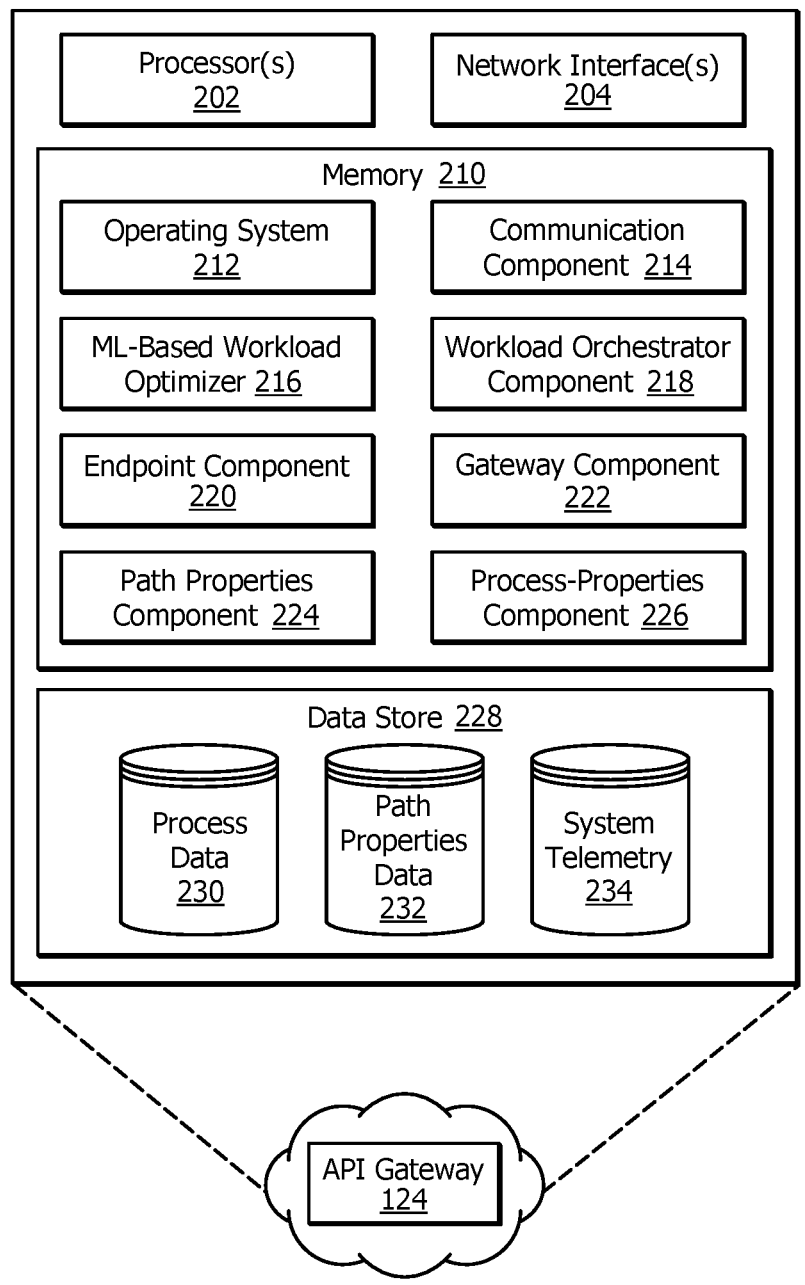
FIG. 2A illustrates a component diagram of an API gateway in accordance with at least one embodiment.

FIG. 2A illustrates a component diagram of an example API gateway 124 that may be utilized to implement aspects of the technologies disclosed herein. The API gateway 124 may be any type of computing device, including a plurality of computing devices and/or virtual computing devices, capable of receiving API requests form API clients, processing that request in various ways as a proxy for the API request, and then dispatching that request to any number of API endpoints.

As illustrated, the API gateway 124 may include one or more hardware processors 202 (processors) configured to execute one or more stored instructions. The processor(s) 202 may comprise one or more cores. Further, the API gateway 124 may include one or more network interfaces 204 configured to provide communications between the API gateway 124 and/or other systems or devices connected to the network 102, data network 122, and/or remote from the networks 102, 122 as described above with respect to FIG. 1. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth. It will be appreciated that the API gateway 124 might not include all of the components shown in FIG. 2A and may include other components that are not explicitly shown in FIG. 2A or might utilize an architecture completely different than that shown in FIG. 2A.

The API gateway 124 may also include memory 210, such as computer-readable media, that stores various executable components (e.g., software-based components, firmware-base components, etc.). The memory 210 may generally store components to implement functionality described herein, such as the ML-based workload optimizer 216. The memory 210 may store an operating system 212 utilized to control the operation of components of the API gateway 124. The operating system 212 may also act as an intermediary between the functions of the API gateway and other devices. Further, the memory 210 may store a communication component 214 that comprises software (e.g., any protocol stack) to enable the API gateway 124 to communicate with other devices using the network interface 204. The communication component 214 may also include mechanisms to encode, decode and process the communication signals transmitted or received to or from other devices.

In some examples, the memory 210 may include a machine learning (ML) workload optimizer component 216 configured to enable API gateway 124 to determine current and predicted future use and configuration of the paths between endpoints and/or the API gateway 124. In some examples, the ML workload optimizer 216 may determine corrective actions to take based on information it receives form a path properties component 224 and/or process-properties component 226 or received form the signals form the other network devices.

In various embodiments, the machine learning (ML) workload optimizer 216 may include a power machine learning-based engine that is able to understand the dynamics of the monitored network, paths, and endpoints to predict and identify potential network issues before they happen. The ML workload optimizer 216 may include any number of machine learning models to perform the methods describe herein, such as predictive analysis and/or trending analytics as follows:

Cognitive Analytics Model(s): The aim of cognitive analytics is to find behavioral patterns in complex and unstructured datasets. For the sake of illustration, ML workload optimizer 216 may be able to extract patterns of network use and system use as well as other behaviors. The ML workload optimizer 216 may characterize such patterns by the nature of the endpoint devices (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns.

Predictive Analytics Model(s): These model(s) may be configured to predict user experiences, which is a significant paradigm shift from reactive approaches to network health. For example, ML workload optimizer 216 may be configured to build predictive models for congestion on each of the paths by taking into account a large plurality of parameters and/or observations (e.g., time of day, number of clients, traffic load, etc.). From this, ML workload optimizer 216 can detect potential network issues before they happen. Furthermore, should abnormal joining times be predicted by the ML workload optimizer 216, other components of the API gateway 124 and/or system will be able to identify the major root cause of this predicted condition, thus allowing the API gateway 124 to remedy the situation before it occurs. The predictive analytics model(s) of ML workload optimizer 216 may also be able to predict other metrics such as the expected throughput for a client using a specific application. In yet another example, the predictive analytics model(s) may predict the user experience for network quality using network variables (e.g., a predicted user rating of 1-5 stars for a given session, etc.), as function of the network state. As would be appreciated, this approach may be far superior to traditional approaches that rely on detecting when performance has dropped below a predetermined threshold. In contrast, API gateway 124 may use the predicted user experiences from ML workload optimizer 216 to provide information to a network administrator or architect in real-time and enable closed loop control over the network. For example, API gateway 124 may signal to a particular type of endpoint device 126A that better QoS will be achieved if the device switches to a different path or nodes.

Trending Analytics Model(s): The trending analytics model(s) may include multivariate models that can predict future states of the network, thus separating noise from actual network trends. Such predictions can be used, for example, for purposes of capacity planning and other "what-if" scenarios. ML workload optimizer 216 may be specifically tailored for use cases in which machine learning (ML) is the only viable approach due to the high dimensionality of the dataset and patterns cannot otherwise be understood and learned. For example, finding a pattern so as to predict the actual user experience of a video call while taking into account the nature of the application, video CODEC parameters, the states of the network (e.g., data rate, RF, etc.), the current observed load on the network, destination being reached, etc., is simply impossible using predefined rules in a rule-based system.

Returning to FIG. 2A, the memory may additionally include a workload orchestrator 218, endpoint component 220, gateway component 222, path properties component 224, and a process-properties component 226 which functions along with other components such as the API gateway 124 and ML-Based workload optimizer 216 to establish and manage paths between client devices, endpoints, and the API gateway 124.

The workload orchestrator 218 works together with other components determine how many endpoints and/or paths are currently present and establish additional paths as needed. Along with the API gateway 124, the workload orchestrator 218 functions to create one or more paths between client devices and endpoint devices. An endpoint component 220 includes logic to respond to an API request. In some examples, the endpoint component 220 may include a process that embodies coded logic to respond to an API request. In some examples, such processes may be implemented in a programing language such as Java, Python, C, etc. A gateway component 222 may process API request and dispatch such request to API endpoint devices 126. In some examples, the gateway component 222 may act as a proxy for API requests and dispatch such request to API endpoint devices 126. The path properties component 224 supplies data about network paths. For instance, the path properties data 232 may include path capacity, latency, jitter, available bandwidth, packet loss, routing hops, Boarder Gateway Protocol (BGP) Autonomous system Number (ASN) encryption type, etc. A process properties component 226 provides process data 230 about the status of specific processes representing API endpoint devices 126. For example, this data 230 may include processing logic errors, relationships with other network devices, and response times of requests to other processes, performance of the process, location for data sovereignty purposes, and memory and processor consumption.

In some examples, the memory 210 may store a component configured to enable the API gateway 124 to store the list of the workloads and endpoints, and the relationships between them in the data store 228. A storing component comprises a human readable code or binary machine code, when executed on the processor 202, may enable the API gateway 124 to store the list of workloads and endpoints in the data store 228.

The API gateway 124 may further include the data store 228, which may comprise any type of computer memory including long-term memory (e.g., Read Only Memory (ROM), Random Access Memory (RAM), caches, etc.). The data store 228 may include process data 230 which includes workload data and path data. The data store 228 may also include a path properties data 232 which includes paths properties data, and data about status of processes. Additionally, the data store 228 may include system telemetry data 234. The system telemetry data 234 may include real-time data as well as historical data that the ML-based workload Optimizer 216 and/or other components of the API gateway 124 may use to model the current system configuration and make determinations of corrective actions that may be necessary to maintain functionality.

Figure 2B:
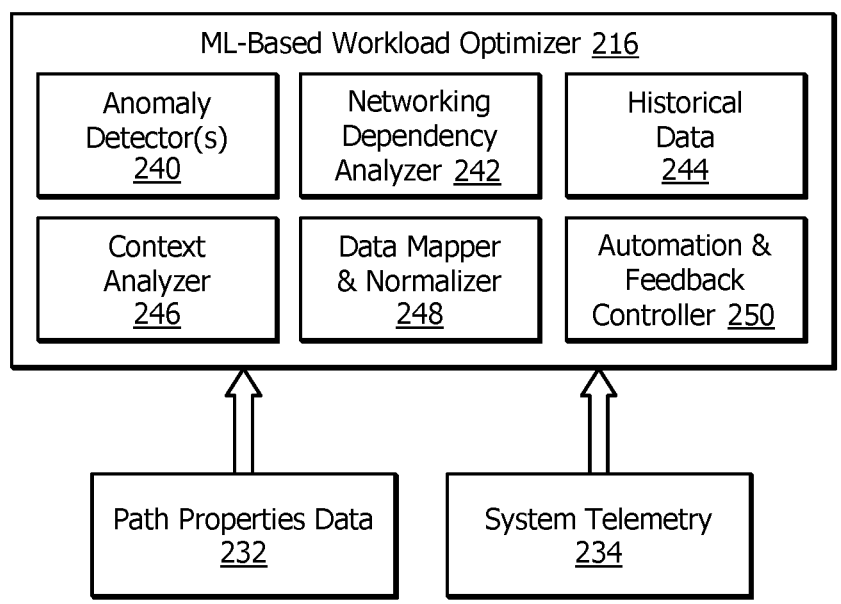
FIG. 2B illustrates the ML-based workload optimizer in accordance with at least one embodiment.

FIG. 2B described the ML-based workload optimizer 216 in more detail.

Operationally, FIG. 2B illustrates an example of a ML-based workload optimizer 216. The ML-based workload optimizer 216 may include such modules/components as: anomaly detector 240, network dependency analyzer 242, historical data 244, context analyzer 246, data mapper and normalizer 248, and automation and feedback controller. As described above, the ML-based workload optimizer 216 may utilize data obtained by the API gateway 124 including path properties data 232 and system telemetry data 234. More or fewer modules/components may be included in the ML-based workload optimizer 216 without departing from the invention. The components may all be part of a single ML-based workload optimizer that is included in an API gateway 124, or they may be provided in a remote device or system that analyzes path properties data 232 and system telemetry data 234 and returns recommendations to the API gateway 124.

Further, these components 240-250 may be implemented in a distributed manner or implemented as a stand-alone service, either as part of the network under observation or as a remote service. These components 240-250 may also be logically implemented as many discrete microservices. In addition, the functionalities of the components of the ML optimizer 216 may be combined, omitted, or implemented as part of other processes.

During operation, the ML optimizer 216 may receive system telemetry data 234 and path properties data 232 from the monitored network and system and, in turn, assess the data using one or more anomaly detectors 240. At the core of each anomaly detector 240 may be a corresponding anomaly detection model, such as an unsupervised learning-based model. Notably, an anomaly detector 240 may access any number of different network and system behaviors captured by the telemetry data (e.g., number of current paths, available bandwidth, system usage, etc.) and, if the observed telemetry differs from the modeled behavior by a threshold amount, the anomaly detector 240 may have the API gateway 124 perform a change to the paths and/or endpoints. Alternatively, or in addition, the anomaly detectors may report the anomaly to the user via a user interface such as a graphical user interface (GUI).

In some embodiments, anomaly detector(s) 240 may also be configured to perform root cause analysis on any detected anomalies. For example, one anomaly detection model may assess a certain feature set (e.g., measurements) from the network, while another model works in conjunction with the first model to attempt to explain why the first model detected an anomaly. By way of example, consider the case in which one model of an anomaly detector 240 uses features and measurements such as throughput, packet loss, jitter, latency, available bandwidth, etc., while another model of the anomaly detector attempts to determine the root cause of the behavioral anomalies by assessing the number of endpoints, the number of attached clients, time of day, and other system characteristics. Rather than simply use a static feature set of measurements that an anomaly detector 240 may use for purposes of detecting behavioral anomalies in the network and/or the root cause of such an anomaly, the techniques herein introduce a mechanism to dynamically adjust the assessed features based on the networking dependencies involved.

In various embodiments, the anomaly detector may use various modules to assist with detecting anomalies as well as producing models to determine further anomalies. In at least one embodiment the anomaly detector may obtain topology information from the network that are associated with the detected anomalies. In various embodiments this topology information may be obtained by a network dependency analyzer 242 that is configured to assess the networking dependencies of the networking devices potentially involved in a behavioral anomaly detected in the monitored network.

Additionally, historical data 244 and context data may be used together with the network topography to create a better model of the network and associated system. The historical data 244 is collected over time by the automation and feedback controller 250. Using this data trends and probabilities may be determined for when a particular network configuration will have deficiencies that need to be corrected. Similarly, context data gathered by the context analyzer 246 form the system telemetry data 234 may be used to identify that when issues are noted what changes to the system may have occurred that prompted the issues to occur.

The topological data produced by the networking dependency analyzer 242, historical data 244 and context data from the context analyzer 246 may be stored until needed and/or be used by the anomaly detector 240 to produce one or more models. Additionally, or alternatively, the ML-based workload optimizer 216 may also include a data mapper and normalizer 248. The data mapper and normalizer may work to parse the historical and context data as well as map the historical data to the pertinent context and components of the network and/or system. This allows the anomaly detector 240 to make appropriate models with a well-organized set of data that provides adequate indication of correspondence to make inferences on the future predicted functioning of the system.

For example, in a non-limiting example, suppose that the history and context data show that every day that between 2 and 3 p.m. one application is used significantly more than at any other time of day. The anomaly detector 240 utilizing historical data 244 and context and network mapping from the analyzers 242 and 246 may produce a model which shows that the number of paths between two endpoints may not be sufficient between those hours. Instead of only increasing the number of paths when a failure occurs between 2 and 3 p.m. and then having extra, un-needed paths, the anomaly detector 240 may determine to establish or add additional paths at 1:30 p.m. and remove them at 3:30 p.m. when the load returns to normal. This may allow those paths to be used by other applications and/or processes that are used more outside those hours.

By making real-time adjustments based on historical and contextual models, the one or more embodiments of the invention may more efficiently utilize network resources while maintaining a necessary level of service. In one or more embodiments it may be desirable to be able to modify or refine the model and thresholds used by the anomaly detector 240. The ML-based workload optimizer 216 may also include an automation and feedback controller 250. During operation, the automation and feedback controller 250 is responsible for collecting feedback on different alerts and/or changes to the network. This feedback may come from a user or administrator or may be based on the real-time data which indicates the changes were not effective or need modifying. In a further embodiment, automation, and feedback controller 250 may collect feedback generated by a third-party application or system in charge of exploiting the root cause proposed by the system. For example, automation and feedback controller 250 or another mechanism may use root cause information for purposes of remediation (e.g., by controlling or adjusting the monitored network) and, based on its effects, provide feedback to the workload optimizer 216. For example, if the root cause of an onboarding issue relates to a specific device causing the trouble, such a mechanism could blacklist the "bad apple." Thus, if the issue does not persist after the remediation action, the mechanism could provide automatic feedback, thus validating the root cause raised by the system in the first place.

Figure 3:
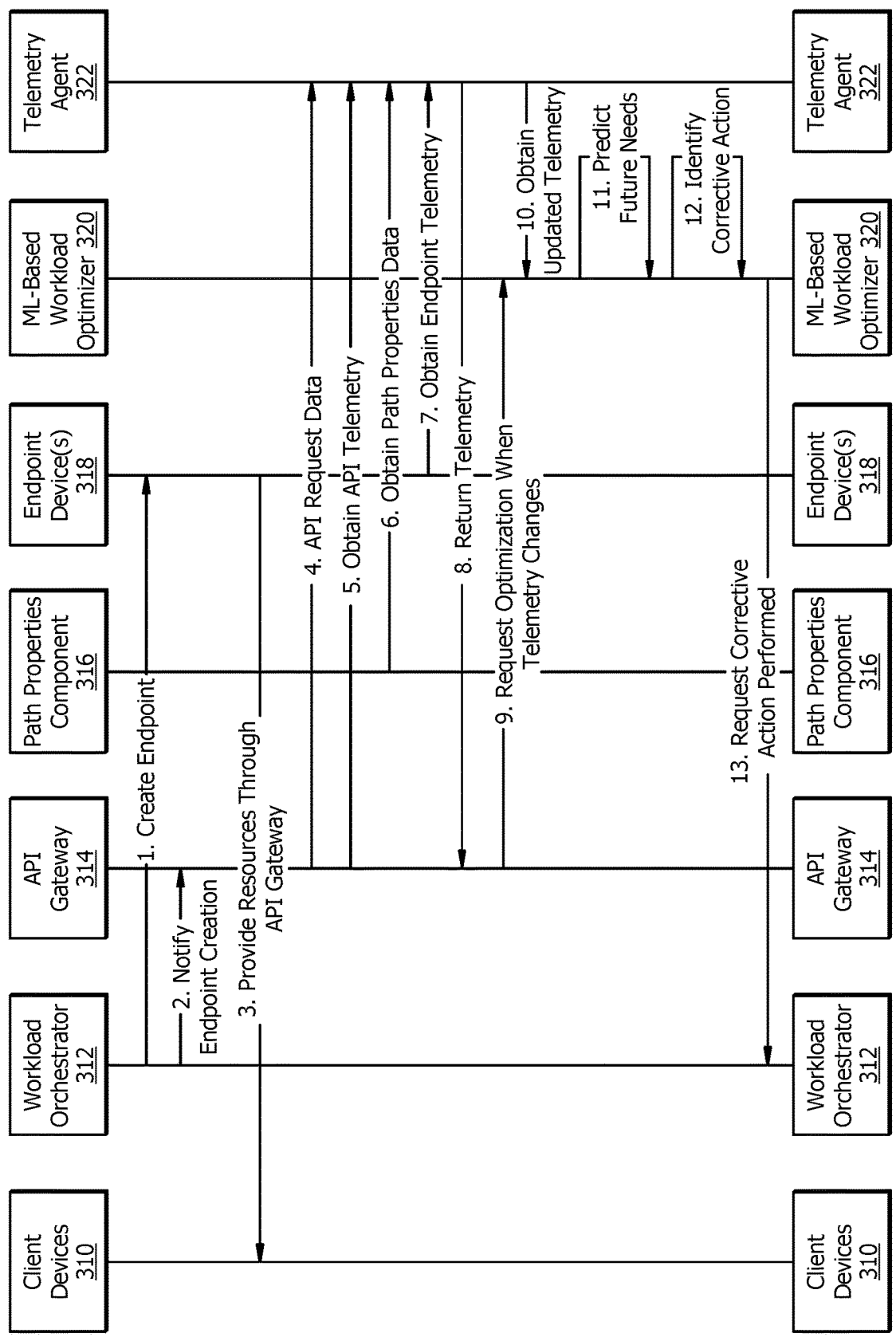
FIG. 3 illustrates a flow diagram of an example method for optimizing pathways in accordance with at least one embodiment.

FIG. 3 illustrates a flow diagram of an example method for an API gateway 124 to establish one or more paths and to use machine learning (ML) to adjust the one or more paths as to prevent or lessen path degradation in a path to a given endpoint to which an API request is directed. If the API gateway detects or predicts a path degradation, it may move the endpoint to a new location or perform other corrections. Additionally, FIG. 3 illustrates communication flow between the network devices according to some aspects of the present disclosure described herein.

The flow diagram in FIG. 3 shows exemplary communication between various devices and modules. One or more of the modules may be identical or similar to those described in more detail above with regards to FIGS. 1, 2A, and 2B. In one or more embodiments the communications occur between a first endpoint or client devices 310, a workload orchestrator 312, API gateway 314, path properties component 316, second endpoint device 318, ML-based workload optimizer 320, and a telemetry agent 322. More or less components may be used when carrying out the invention and the invention is not limited to those components shown in FIG. 3.

At step 1, a first endpoint may be created. This may be a result of at least one of the client devices 310 requesting at least one connection to a second endpoint device 318 or may be the result of other processes including, but not limited to, having a new server come on-line, a new service or resource being provided, and/or changes in network conditions. When a process or need for a new endpoint is determined by the workload orchestrator, it request the creation of a new endpoint at an endpoint device 318. With the creation of the endpoint 318 a path is created between at least the endpoint device and the API gateway 314.

Once one or more paths are created in step 1, the workload orchestrator 312 then notifies the API gateway 314 in step 2 that the endpoint 318 has been created and/or one or more paths have been created between the endpoint and at least the API gateway 314. At this time, as shown in step 3, the endpoint device 318, begins to provide one or more resources such as, but not limited to, data and/or applications through the API gateway 314 to one or more client devices 310. This continues as long as the client device 310 continues to need the resources provided by the Endpoint device 318. If in the future the resource is no longer needed by any client devices 310, the endpoint device 318 may be removed from the system or modified, and any future needs by any of the client devices 310 would require steps 1-3 to be repeated.

While the API gateway 314 continues to provide resources to the client devices 310 from one or more endpoints such as endpoint device 318, the API gateway 314 may request data from the telemetry agent 322 in step 4. These requests may occur continuously while the endpoint continues to provide the resources (in step 3), or may occur periodically such as, but not limited to, every second, minute, hour, or day or other period of time determined by an administrator, developer, system manager, or other concerned party.

The telemetry agent 322 obtains telemetry and path information in steps 5-7 from the API gateway 314 (step 5), path properties component 316 (step 6), and at least one endpoint device 318 (step 7). The path properties data (step 6) may include, but not be limited to, such information as latency, jitter, available bandwidth, packet loss, speed, etc. While the API and endpoint telemetry (steps 5 and 7) may include such information as workload, time, system statistics, path utilization, underutilization, network bandwidth, number of endpoint devices currently providing resources, number of client devices 310 that are connected to the API gateway 314 and/or each endpoint device 318, and other pertinent data. The telemetry may also include context data obtained from external sources such as external cloud environment, Internet based servers, databases, and other sources.

Once the telemetry agent 322 gathers all the telemetry needed, in step 8 it returns the system telemetry to the API gateway as well as other components such as the ML-based workload optimizer 320. These steps (4-8) may be continuously performed or periodically performed as discussed above with regards to step 4.

Further the API gateway 314 or other component such as the ML-based workload optimizer 320 may store the resulting telemetry data in logs or other storage means, in order to be able to analyze historic trends. Depending on storage capacity and the amount of data, only a portion of the telemetry data may be kept, or all of the data may be kept. The data may alternatively or also be parsed based on the needs of the ML-based workload optimizer 320 and/or API gateway 314.

The API gateway 314 continues to receive telemetry continuously or periodically from the telemetry agent 322 in step 8. At some point the API gateway 314 may determine that optimization is needed. This may be when the telemetry has determined one or more characteristics of the system have changed by a preset amount such as, but not limited to, one or more endpoints begin to operate above a preset percentage of their capacity, latency increases by a set percentage, and/or a predetermined amount of time has passed. Once the API gateway 314 or another component determines that optimization is needed, the API gateway 314, or other component request optimization in step 9.

The ML-based workload optimizer 320 receives the request in step 9 and obtains updated telemetry from the telemetry agent 322 in step 10. At this point, if it does not continuously receive telemetry, the ML-based workload optimizer 320 may also request logs and/or other records of the telemetry obtained over a predetermined amount of time.

Once the telemetry agent 322 has obtained updated telemetry, in steps 11 and 12, the ML-based workload optimizer 320 analyzes the telemetry, as well as historical and context-based data to produce models of the system, network, and/or paths. By analyzing the telemetry and historical data, the workload optimizer 320 can determine present and predicted future path information such as latency, jitter, available bandwidth, packet loss, speed, etc. The collected telemetry and historical data may also indicate CPU load level, and other endpoint device data. Based on these models and the current real-time telemetry obtained in step 10, the ML-based workload optimizer 320 may predict the future needs (and/or the current needs) of the system in step 11. Once anomalies or deficiencies both current and predicted are noted by the ML-based workload optimizer 320, corrective actions are also determined in step 12.

At step 13, the ML-based workload optimizer 320 then returns suggested corrective actions to the workload orchestrator 312 which then implements the corrections. Alternatively, or in addition, the ML-based workload optimizer 320 may notify a user or administrator that deficiencies may or are occurring so that the user or administrator may take appropriate actions such as adding additional physical connections and/or modifying the network and system configurations to prevent further degradation. Steps 9-13 may be repeated whenever changes in the telemetry are determined by the API gateway 314 or another component to necessitate a new optimization.

Figure 4:
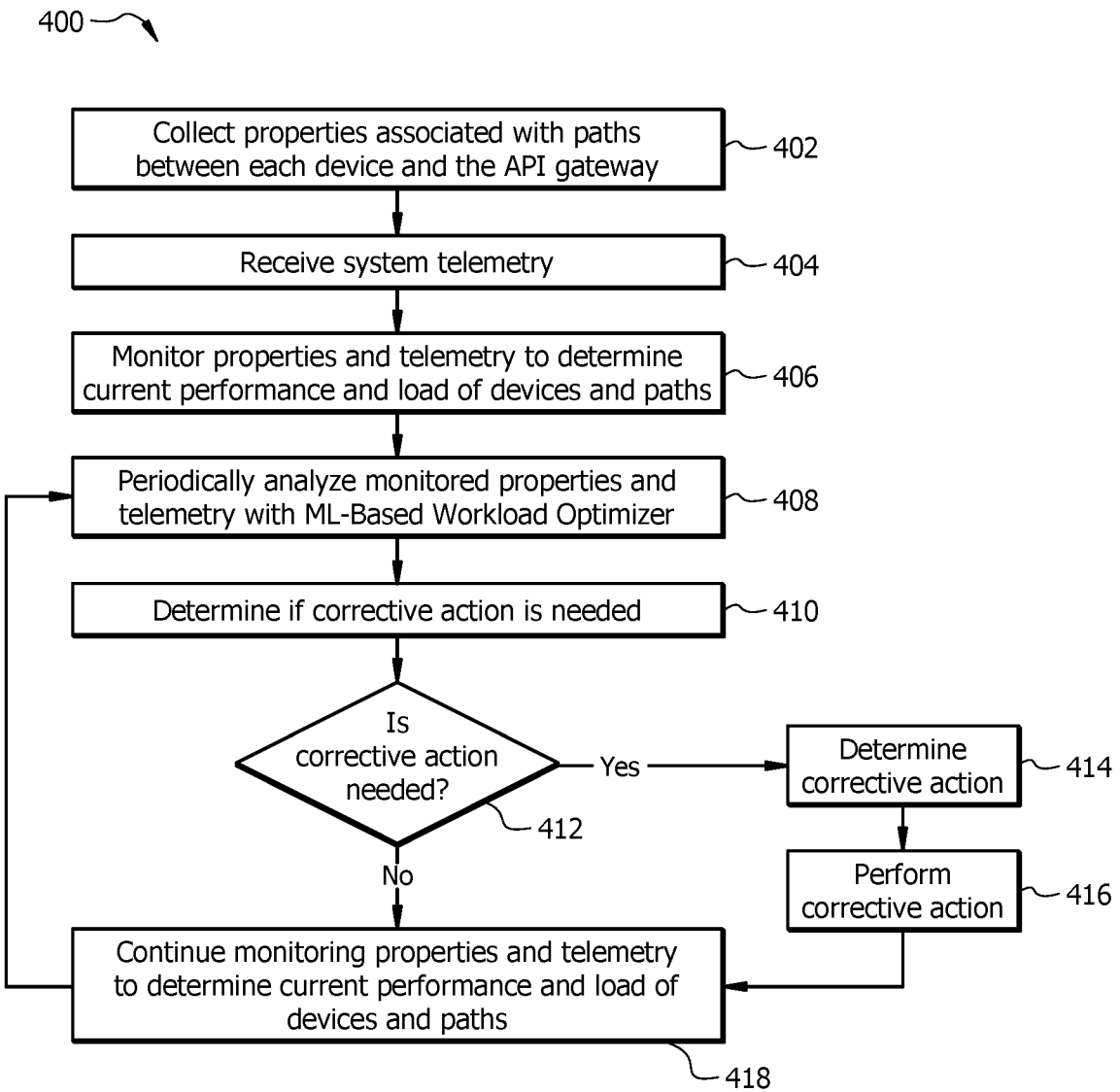
FIG. 4 illustrates a diagram of a method for an API gateway and ML-Based workload optimizer to monitor the performance of a path and perform corrective action in accordance with at least one embodiment.

FIG. 4 illustrates an exemplary method 400 for performing load balancing in an API gateway 124 including a ML-based workload optimizer 216, in accordance with one or more embodiments.

At step 402, the API gateway monitors properties associated with paths between each device/endpoint and the API gateway. In one or more embodiments at least one of the endpoints is a client device while another endpoint is a node that provides data or services to the client device and/or an application hosted by the client device. More than one path may exist between any endpoint and the API gateway. Each of those paths have properties such as, but not limited to, bandwidth, current usage, performance (such as latency, dropped data/packets, etc.). The API gateway or related components monitors the plurality of paths periodically or continuously to determine performance level for each of the plurality of paths.

Once the properties associated with the paths are collected in step 402 or concurrently, the API gateway monitors the endpoints by receiving system telemetry in step 404. As described above, the telemetry includes data on the endpoints (including both those located in a data center or cloud environment) and those located at a client or user device and data on the network(s). This telemetry may include data on workloads, system failures, time, temperature, and any other data that might be useful in determining an appropriate configuration of the one or more paths between the API gateway and each endpoint.

Once both the system telemetry and properties are obtained in steps 402 and 403, the method monitors this data to determine a current level of performance for the path, as well as the current load of the endpoint/device and paths in step 406. In one or more embodiments, this data may also be stored as historical or context data so that a model may be prepared and/or continuously refined that allows for a ML-based workload optimizer to predict future system states and network/path needs.

Using the model and telemetry, in step 408 the ML-based workload optimizer then periodically or continuously analyzes the telemetry and properties. The ML-based workload optimizer uses the periodic analyzation to determine if corrective action is required in step 410. This may be when deficiencies in one or more paths are greater than a threshold amount (for example, in a non-limiting example, if the path has degraded by 40%, immediate action may be indicated) or if the current system configuration, time, or other property, based on one or more models, indicates that the current configuration may not be sufficient to maintain the paths between endpoints and the API gateway with a sufficient level of performance.

If corrective action is determined to be needed in step 412, the method then proceeds to step 414 where the appropriate corrective action is determined. Corrective actions may include moving the API gateway and updating a Domain Name System (DNS), instructing a network controller associated with a Software Defined-Wide Area Network (SD-WAN) to increase network resources, adding or subtracting one or more paths between the API gateway and at least one endpoint, reconfiguring the paths and or other corrections as are determined by the modeling or other processes to improve the functioning of the system. The API gateway determines a remedial action to take to remedy the performance degradation experience or that will be experienced by at least one of the paths. In some examples, the API gateway may move an endpoint, change the path route, change path properties, change endpoint workload properties, etc.

At step 416, the API gateway performs the corrective action such as moving the endpoint or changing the route, and thus optimizes the workload or otherwise brings the overall system in to a state of compliance. Traditional API gateways might consider the state of workloads (load-ware load balancing) based on, for example, the CPU load of servers. However, the API gateway described herein comprises, or is included in, utilizes one or more ML models so that the API gateway system considers and is aware of various other parameters and predicted future parameters beyond simply looking at the load of the workloads. While the load of the workload may be contemplated as part of the optimal compliance for moving the endpoint, changing the route, changing path properties, etc., predicted future needs may also be considered in deciding where the move the endpoint or to change the route or other properties of the system and/or path.

In one or more embodiments, it may be determined that the API gateway or one or more other components of the system such as the endpoints need to be moved in order to provide better service or to have a more efficient geographical location. When moving the API gateway, the DNS needs to be updated. Similarly, if one or more endpoints are moved, appropriate changes to DNS or other routing tables needs to be made. Other changes to the system may be made such as having a SD-WAN increase network resources to at least one of the plurality of paths, adding at least one path, removing a path, reconfiguring one or more paths, etc.

Once the corrective action is performed in step 416 or when no corrective action is determined to be needed in step 412, the method proceeds to step 418. In step 418 the properties and telemetry are continued to be monitored and steps 408-418 repeat until one or more paths are no longer needed or other changes occur in the system.

Figure 5:
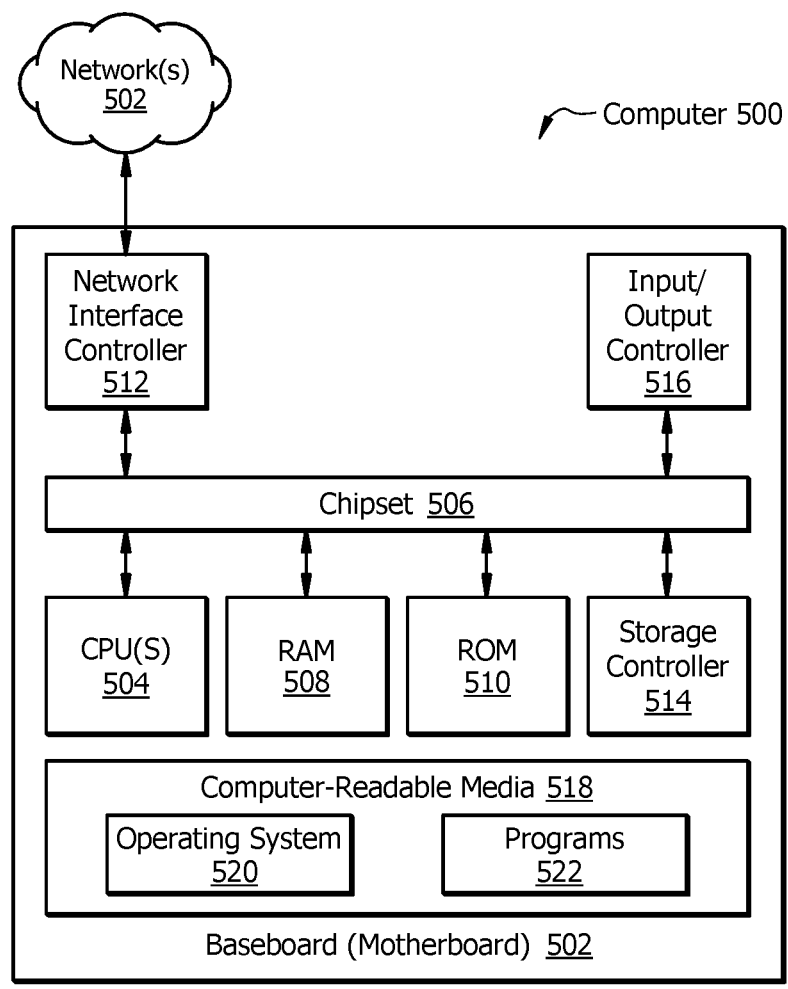
FIG. 5 illustrates a computer architecture diagram shown in an illustrative computer hardware architecture in accordance with at least one embodiment.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and may be utilized to execute any of the software components presented herein. The computer 500 may, in some examples, correspond to an API gateway (e.g., 124, FIG. 1), and/or any other device described herein, and may comprise personal devices (e.g., smartphones, tablets, wearable devices, laptop devices, etc.), networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices may be connected by way of a system bus or other electrical communication paths. In one illustrative configuration, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the state of one or more other switching elements, such as logic gateway. These basic switching elements may be combined to create more complex logic circuits including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the configurations described herein.

The computer 500 may operate in a networked environment using logical connection to remote computing devices and computer systems through a network, such as the networks 102 and 122 shown in FIG. 1. The chipset 506 may include functionality for providing network connectivity through a Network Interface (NIC) 512, such as a gigabit Ethernet adapter. The NIC 512 can connect the computer 500 to other computing devices over the network. It should be appreciated that multiple NICs 512 may be present in the computer 500, connecting the computer to other types of networks and remote computer systems.

The computer 500 may be connected to a computer-readable media 518 or other form of storage device that provides non-volatile storage for the computer 500. The computer-readable media 518 may store an operating system 520, programs 522, and other data. The computer-readable media 518 may be connected to the computer 500 through a storage controller 514 connected to the chipset 506. The computer-readable media 518 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the computer-readable media 518 by transforming the physical state of the physical storage units to reflect the information being stored. The specific transformation of physical state may depend on various factors in different embodiments of this description. Examples of such factors may include, but are not limited to, the technology used to implement the physical storage units, whether the storage device is characterized as primary or secondary storage and the like.

For example, the computer 500 may store information to the computer readable media 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description with the foregoing examples provided only to facilitate this description. The computer 500 may further read information form the computer readable media 518 by detecting the physical states or characteristics of one or more locations within the physical storage units.

In addition to the computer-readable media 518 described above, the computer 500 may have access to other computer-readable storage media to store and retrieve information, such as program modules, data structures or other data. It should be appreciated by those skilled in the art that computer-readable storage media is any available media that provides for the non-transitory storage of data and that may be access by the computer 500. In some examples, the operations performed by the client devices (e.g., FIG. 1, 106), API gateway (e.g., FIG. 1, 124), and or any components included therein, may be supported by one or more devices similar to computer 500. Stated otherwise, some or all of the operations performed by the API gateway and or any components included therein, may be performed by one or more computer devices 500.

By way of example and not limitation, computer-readable storage media may include volatile and non-volatile, removable, and non-removable media implemented in a method or technology. Computer-readable storage media includes, but is not limited to, RAM, ROM, erasable programmable ROM ("EPROM"), electrically-erasable programmable ROM ("EEPROM"), flash memory or other solid-state memory technology compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the computer-readable media 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The computer-readable media 518 may store other system or application programs and data utilized by the computer 500.

In one embodiment, the computer-readable media 518 or other computer-readable storage media is encoded with computer-executable instructions which, when loaded into the computer 500, transform the computer from a general-purpose computing system in at special-purpose computer capable of implementing the embodiments described herein. These computer executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regards to FIGS. 1-4. The computer 500 may also include computer-readable storage media having instructions stored thereupon for performing any of the other computer implemented operations described herein.

The computer 500 may also include one or more input/output controllers 516 for receiving and processing input from several input devices, such as a keyboard, a mouse, a touchpad, a touch screen, an electronic stylus, or other type of input device. Similarly, an input/output controller 516 may provide output to a display such as a computer monitor, a flat panel display, a digital projector, a printer, or other type of output device. It will be appreciated that the computer 500 might not include all of the components shown in FIGS. 1, 2A, and 2B, may include other components that are not explicitly shown in FIGS. 1, 2A, and 2B, or might utilize an architecture completely different than that shown in FIGS. 1, 2A, and 2B.

As described herein, the computer 500 may comprise one or more of API gateways (e.g., 124, FIGS. 1, 2A, and 2B), ML-based workload optimizer(s) (e.g., 216, FIGS. 2A and 2B), and/or any other device. The computer 500 may include one or more hardware processors 504 (CPUs) configured to execute one or more stored instructions. The processors(s) 504 may comprise one or more cores. Further, the computer 500 may include one or more network interfaces 512 configured to provide communications between the computer 500 and other devices, such as the communications described herein as being performed by the API gateway. The network interface may include devices configured to couple to personal area networks (PANS), wired and wireless local area networks (LANS), wired and wireless wide area networks (WANS), and so forth. For example, the network interfaces may include devices compatible with Ethernet, WI-FI™, and so forth.

The programs 522 may comprise any type of programs or processes to perform the techniques described in this disclosure for workload optimization by the API gateway in a network environment.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any practical order. Further, some steps may be performed simultaneously. The illustration of a process in a drawing does not exclude variations and modifications, does not imply that the process or any of its steps are necessary to one or more of the inventions, and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

While the invention is described with respect to the specific examples, it is to be understood that the scope of the invention is not limited to these specific examples, Since other modifications and changes varied to fit particular operating requirements an environments will be apparent to those skilled in the art, the invention is not considered limited to the example chosen for purposes of disclosure, and covers all changes and modifications which do not constitute departures form the true spirit and scope of this invention.

Although the application described embodiments having specific structural features and/or methodological acts, it is to be understood that the claims are not necessarily limited to the specific features or acts described. Rather, the specific features and acts are merely illustrative of some embodiments that fall within the scope of the claims of the application.

The invention claimed is:

1. A method, comprising:
   collecting properties associated with each of a plurality of paths between at least one device and an Application Programing Interface (API) gateway, wherein the at least one device comprises at least an endpoint device;
   monitoring the properties associated with each of the plurality of paths to determine a current level of performance for each of the plurality of paths;
   monitoring the at least one device to determine a current load of the at least one device;
   analyzing, using machine learning, the current level of performance for each of the plurality of paths and the current load of the at least one device to produce a predictive analytics model for congestion on each of the plurality of paths;
   determining, using the predictive analytics model, if a corrective action is needed to maintain an optimal performance of the API gateway, the plurality of paths, and the at least one device based on at least the current level of performance for each of the plurality of paths and the current load of the at least one device; and
   performing the corrective action when the predictive analytics model indicates that the corrective action is needed.

2. The method of claim 1, wherein monitoring the properties of each of the plurality of paths includes determining latency, jitter, available bandwidth, and packet loss of each of the plurality of paths.

3. The method of claim 1, wherein monitoring the at least one device comprises:
   collecting telemetry from the at least one device; and
   monitoring the at least one device to determine current needs of the at least one device.

4. The method of claim 3, wherein the telemetry includes at least CPU load level of the at least one device.

5. The method of claim 1, further comprising:
   monitoring context data from an external source to the at least one device; and
   wherein analyzing with machine learning further comprises analyzing the context data to predict future needs of the at least one device and the API gateway.

6. The method of claim 1, wherein the corrective action comprises establishing an additional path between the at least one device and the API gateway.

7. The method of claim 1, wherein the corrective action comprises removing at least one path between the at least one device and the API gateway.

8. The method of claim 1, wherein the corrective action comprises reconfiguring at least one path between the at least one device and the API gateway.

9. The method of claim 8, wherein reconfiguring the at least one path comprises:
moving the API gateway to a new location.

10. The method of claim 8, wherein reconfiguring the at least one path includes instructing a network controller associated with a Software Defined-Wide Area Network (SD-WAN) to increase network resources of at least one of the plurality of paths.

11. A computer system, comprising:
an Application Programing Interface (API) gateway that comprises:
one or more processors; and
one or more computer-readable non-transitory storage media coupled to the one or more processors that stores instructions operable when executed by the one or more processors to cause the computer system to perform a method comprising:
collecting properties associated with each of a plurality of paths between at least one device and the API gateway, wherein the at least one device comprises at least one endpoint device;
monitoring the properties associated with each of the plurality of paths to determine a current level of performance for each of the plurality of paths;
monitoring the at least one device to determine a current load of the at least one device;
analyzing, using machine learning, the current level of performance for each of the plurality of paths and the current load of the at least one device to produce a predictive analytics model for congestion on each of the plurality of paths;
determining, using the predictive analytics model, if a corrective action is needed to maintain an optimal performance of the API gateway, the plurality of paths, and the at least one device based on at least the current level of performance for each of the plurality of paths and the current load of the at least one device; and
performing the corrective action when the predictive analytics model indicates that the corrective action is needed.

12. The system of claim 11, wherein monitoring the properties of each of the plurality of paths includes determining latency, jitter, available bandwidth, and packet loss of each of the plurality of paths.

13. The computer system of claim 11, wherein monitoring the at least one device comprises of:
collecting telemetry from the at least one device; and
monitoring the at least one device to determine current needs of the at least one device.

14. The computer system of claim 13, wherein the telemetry includes at least CPU load level of the at least one device.

15. The computer system of claim 11, wherein the method further comprises:
monitoring context data from an external source to the at least one device; and
wherein analyzing with machine learning further comprises analyzing the context data to predict future needs of the at least one device and the API gateway.

16. The computer system of claim 11, wherein the corrective action comprises of establishing an additional path between the at least one device and the API gateway.

17. The computer system of claim 11, wherein the corrective action comprises removing at least one path between the at least one device and the API gateway.

18. The computer system of claim 11, wherein the corrective action comprises reconfiguring at least one path between the at least one device and the API gateway.

19. The computer system of claim 18, wherein reconfiguring the at least one path comprises:
moving the API gateway to a new location.

20. At least one non-transitory computer-readable storage medium having stored therein instructions which, when executed by one or more processors, cause the one or more processors to:
collect properties associated with each of a plurality of paths between at least one device and an Application Programing Interface (API) gateway, wherein the at least one device comprises at least an endpoint device;
monitoring the properties associated with each of the plurality of paths to determine a current level of performance for each of the plurality of paths;
monitoring the at least one device to determine a current load of the at least one device;
analyzing, using machine learning, the current level of performance for each of the plurality of paths and the current load of the at least one device to produce a predictive analytics model for congestion on each of the plurality of paths;
determining, using the predictive analytics model, if a corrective action is needed to maintain an optimal performance of the API gateway, the plurality of paths, and the at least one device based on at least the current level of performance for each of the plurality of paths and the current load of the at least one device; and
performing the corrective action when the predictive analytics model indicates that the corrective action is needed.

* * * * *